United States Patent
Kay et al.

(10) Patent No.: US 6,729,576 B2
(45) Date of Patent: May 4, 2004

(54) COMPOSITE TAIL CONE ASSEMBLY

(75) Inventors: Bruce Frederic Kay, Milford, CT (US); Alan Roy Goodworth, Stratford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 10/219,170

(22) Filed: Aug. 13, 2002

(65) Prior Publication Data

US 2004/0031879 A1 Feb. 19, 2004

(51) Int. Cl.⁷ .............................................. B64C 27/00
(52) U.S. Cl. .................... 244/17.11; 244/17.19
(58) Field of Search ........................ 244/17.11, 17.17, 244/17.19, 17.21, 119, 123, 109

(56) References Cited

U.S. PATENT DOCUMENTS

| | | | |
|---|---|---|---|
| 4,086,378 A | * 4/1978 | Kam et al. | .................. 428/34.5 |
| 4,695,013 A | * 9/1987 | Trampnau | ................ 244/17.13 |
| 5,251,847 A | * 10/1993 | Guimbal | .................. 244/17.19 |
| 5,377,934 A | * 1/1995 | Hill | .......................... 244/17.11 |
| 5,562,264 A | * 10/1996 | Bietenhader | ................ 244/120 |
| 6,179,086 B1 | * 1/2001 | Bansemir et al. | ........... 181/292 |
| 6,352,220 B1 | * 3/2002 | Banks et al. | ............. 244/17.19 |
| 6,446,907 B1 | * 9/2002 | Wilson et al. | ........... 244/17.11 |

OTHER PUBLICATIONS

Website: "M–130 Chaff Dispenser", description of chaff dispenser for use on an M–130 helicopter; http://incolor.inebraska.com/iceman/pilot12.htm.*

Website: "M–130 General Purpose Dispenser", description of chaff dispenser for use on an M–130 helicopter; http://www.fas.org/man/dod–101/sys/ac/equip/m–130.htm.*

* cited by examiner

Primary Examiner—Michael J. Carone
Assistant Examiner—Gabriel S Sukman
(74) Attorney, Agent, or Firm—Bachman & LaPointe, P.C.

(57) ABSTRACT

The present invention broadly relates to a tail cone assembly for a helicopter. The tail cone assembly includes a monocoque shell formed from a composite material. The composite material preferably comprises a non-metallic matrix, such as an epoxy resin matrix, having fibers, such as graphite fibers, embedded therein. The fibers may be oriented along a single axis or along multiple axes. Other components of the tail cone assembly may also be formed from composite materials, which composite materials may be the same as or different from the composite material forming the shell.

37 Claims, 5 Drawing Sheets

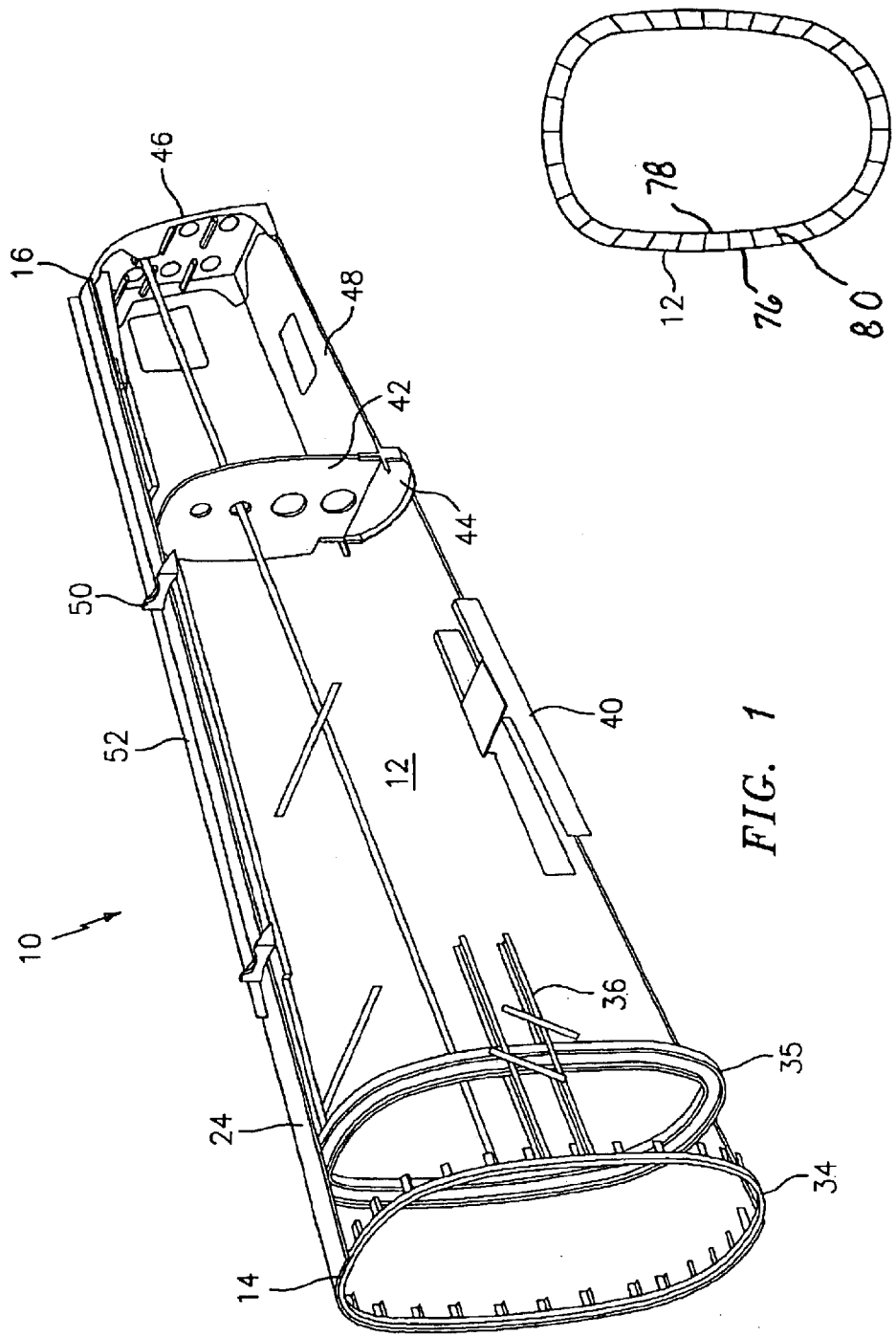

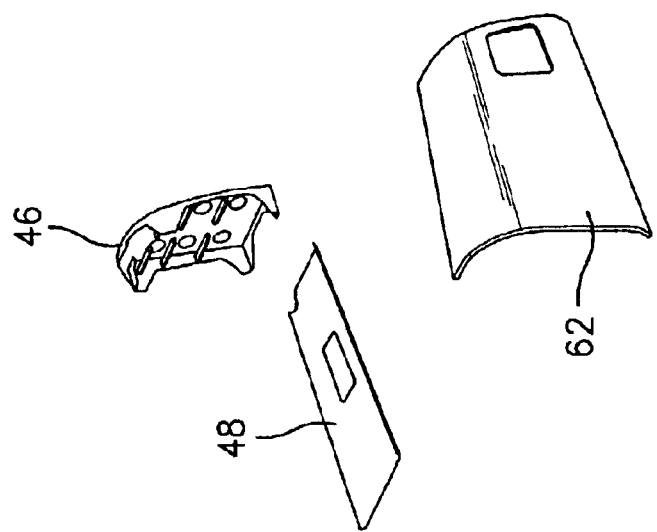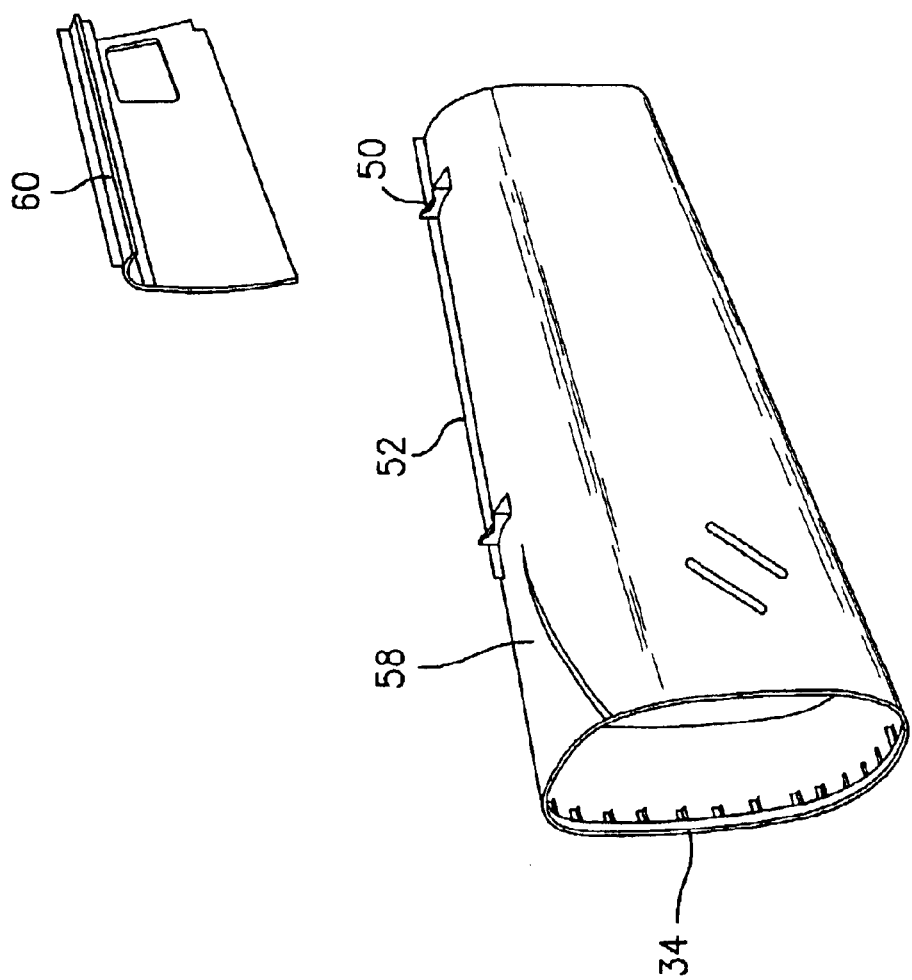
FIG. 6

COMPOSITE TAIL CONE ASSEMBLY

BACKGROUND OF THE INVENTION

The present invention relates to a tail cone formed from a composite material. The tail cone has particularly utility on helicopters.

Conventional tail cones on helicopters are formed from metallic materials such as aluminum and aluminum alloys. As a result, these tail cones are heavy and expensive to produce. There is a need for tail cone assemblies formed from lightweight, inexpensive materials which have strength properties similar to, or better than, conventional metal tail cone assemblies.

SUMMARY OF THE INVENTION

Accordingly, it is an object of the present invention to provide a tail cone which is lighter in weight and less expensive than conventional tail cone assemblies.

It is another object of the present invention to provide a tail cone as above which has particular utility on helicopters.

The foregoing objects are attained by the tail cone of the present invention.

In accordance with the present invention, a tail cone broadly comprises a monocoque shell formed from a composite material. The composite material preferably comprises a non-metallic matrix, such as an epoxy resin matrix, having fibers, such as graphite fibers, embedded therein. The fibers may be oriented along a single axis or along multiple axes. Other components of the tail cone assembly may also be formed from composite materials, which composite materials may be the same as or different from the composite material forming the shell.

Other details of the composite tail cone assembly of the present invention, as well as other objects and advantages attendant thereto, are set forth in the following detailed description and the accompanying drawings wherein like reference numerals depict like elements.

BRIEF DESCRIPTION OF THE DRAWINGS

FIG. 1 is a sectional view of a tail cone in accordance with the present invention;

FIG. 3 is a sectional view of a sandwich construction which may be used to form the tail cone of the present invention;

FIG. 6 is an exploded view of a third embodiment of a tail cone in accordance with the present invention.

DETAILED DESCRIPTION OF THE PREFERRED EMBODIMENT(S)

Figure 4:
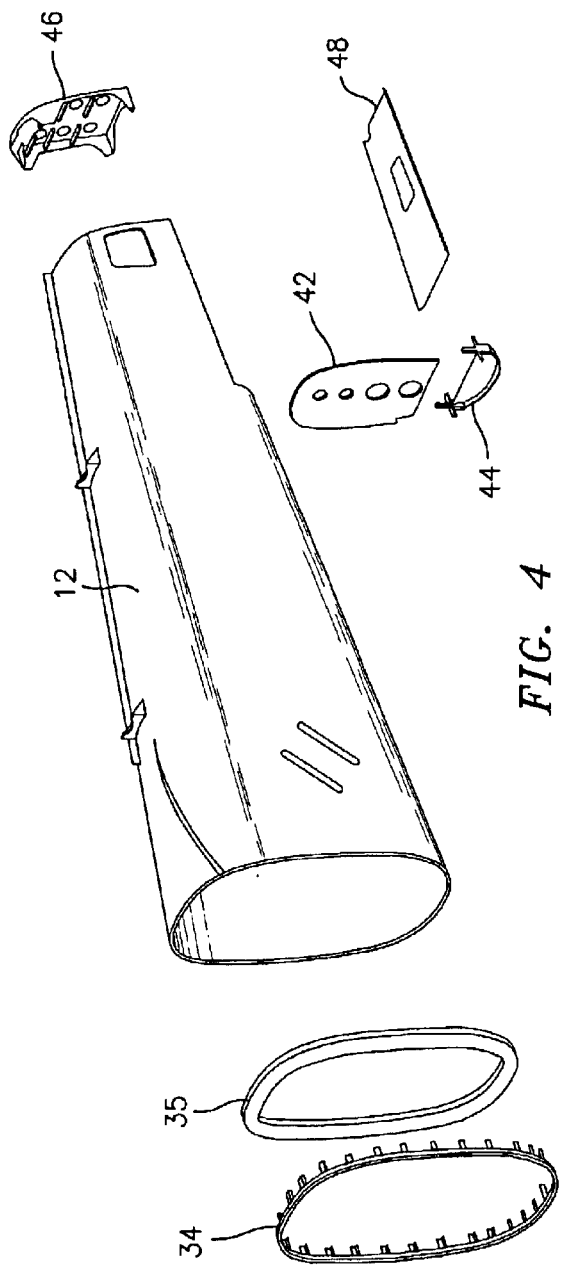
FIG. 4 is an exploded view of a first embodiment of a tail cone in accordance with the present invention.

FIG. 1 illustrates a tail cone assembly 10 for use with a helicopter in accordance with the present invention. The tail cone assembly 10 has a hollow monocoque shell 12 which is preferably formed from a composite material having a non-metallic matrix with fibers embedded therein. The fibers may be oriented along one direction or along multiple directions. A particularly useful composite material is an epoxy resin matrix having graphite fibers embedded therein.

The shell 12 has a leading edge 14, a trailing edge 16, an upper surface 18, a lower or bottom surface 20 and a pair of side walls 22 and 24. The upper surface 18 and the side walls 22 and 24 each extend from the leading edge 14 to the trailing edge 16 of the shell 12. The bottom surface 20 however extends from the leading edge 14 of the shell to a point 26 distant from the trailing edge 16, thus leaving an opening 28 through which equipment relating to the rear landing gear 30 can be placed within the shell 12.

Each of the side walls 22 and 24 may be provided with an opening 32 for allowing access to the equipment relating to the rear landing gear 30. Further, the shell 12 preferably tapers from the leading edge 14 to the trailing edge 16.

As shown in FIG. 1, a tail cone attachment fitting 34 is positioned within the shell 12 adjacent the leading edge 14 of the shell and is used to join the tail cone assembly 10 to the fuselage 38 of the helicopter. The tail cone attachment fitting 34 may be joined to the shell 12 using any suitable means known in the art. The tail cone attachment fitting 34 could be formed from a lightweight metallic material or a composite material having a non-metallic matrix. When formed from a composite material, the composite material could be the same as, or different from, the composite material forming the shell.

Also positioned within the shell 12 is a frame 35. The frame 35 may be joined to the shell 12 using any suitable means known in the art. The frame 35 may be formed from a lightweight metallic material or by a composite material having a non-metallic matrix. When the frame 35 is formed from a composite material, the composite material may be the same as, or different from, the composite material forming the shell 12. For example, the frame 35 could be formed from an epoxy-resin matrix having graphite fibers embedded therein.

A plurality of chaff dispenser supports 36 may be mounted on the side walls 22 and 24 of the shell using any suitable means known in the art. The supports 36 may be formed from a metallic material or from a composite material having a non-metallic matrix. When formed from a composite material, the composite material may be the same as, or different from, the composite material forming the shell 12.

An antenna support 40 is located within the shell 12 and secured to the bottom surface 20 using any suitable means known in the art. The antenna support 40 is used to secure an antenna to the helicopter. The antenna support 40 may be formed from a lightweight metallic material or from a composite material having a non-metallic matrix. When formed from a composite material, the composite material may be the same as, or different from, the composite material forming the shell 12.

A landing support bulkhead 42 is positioned within the shell 12 at the position of the point 26. The landing support bulkhead 42 may be secured to the shell 12 using any suitable means known in the art and may be formed from a lightweight metallic material or from a composite material having a non-metallic matrix. When the bulkhead 42 is formed from a composite material, the composite material may be the same as, or different from, the composite material forming the shell 12.

Attached to the landing support bulkhead 42 is a tie down support 44. The support 44 may be formed from a lightweight metallic material or a composite material having a non-metallic matrix. When the support 44 is formed from a composite material, the composite material may be the same as, or different from, the composite material forming the shell 12.

A tail rotor pylon support 46 is secured to the trailing edge 16 of the shell 12. Any suitable means known in the art may be used to secure the support 46 to the shell 12. The support 46 may be formed from a lightweight metallic material or from a composite material having a non-metallic matrix. When the support 46 is formed from a composite material, the composite material may be the same as, or different from, the composite material forming the shell 12.

A landing gear support plate 48 is provided to close off the opening 28. The plate 48 may be secured to the bulkhead 42, the pylon support 46, and to the side walls 22 and 24 of the shell 12 using any suitable means known in the art. The plate 48 may be formed from a lightweight metallic material or a composite material having a non-metallic matrix. When the plate 48 is formed from a composite material, the composite material may be the same as, or different from, the composite material forming the shell 12.

A plurality of drive shaft supports 50 and drive shaft cover supports 52 are mounted to the upper surface 18 of the shell. Any suitable means known in the art may be used to mount the supports 50 and 52 to the shell 12. Each of the drive shaft supports 50 and drive shaft cover supports 52 may be formed from a lightweight metallic material or a composite material having a non-metallic matrix. When the supports 50 and/or 52 are formed from a composite material, the composite material may be the same as, or different from, the composite material forming the shell 12.

Figure 5:
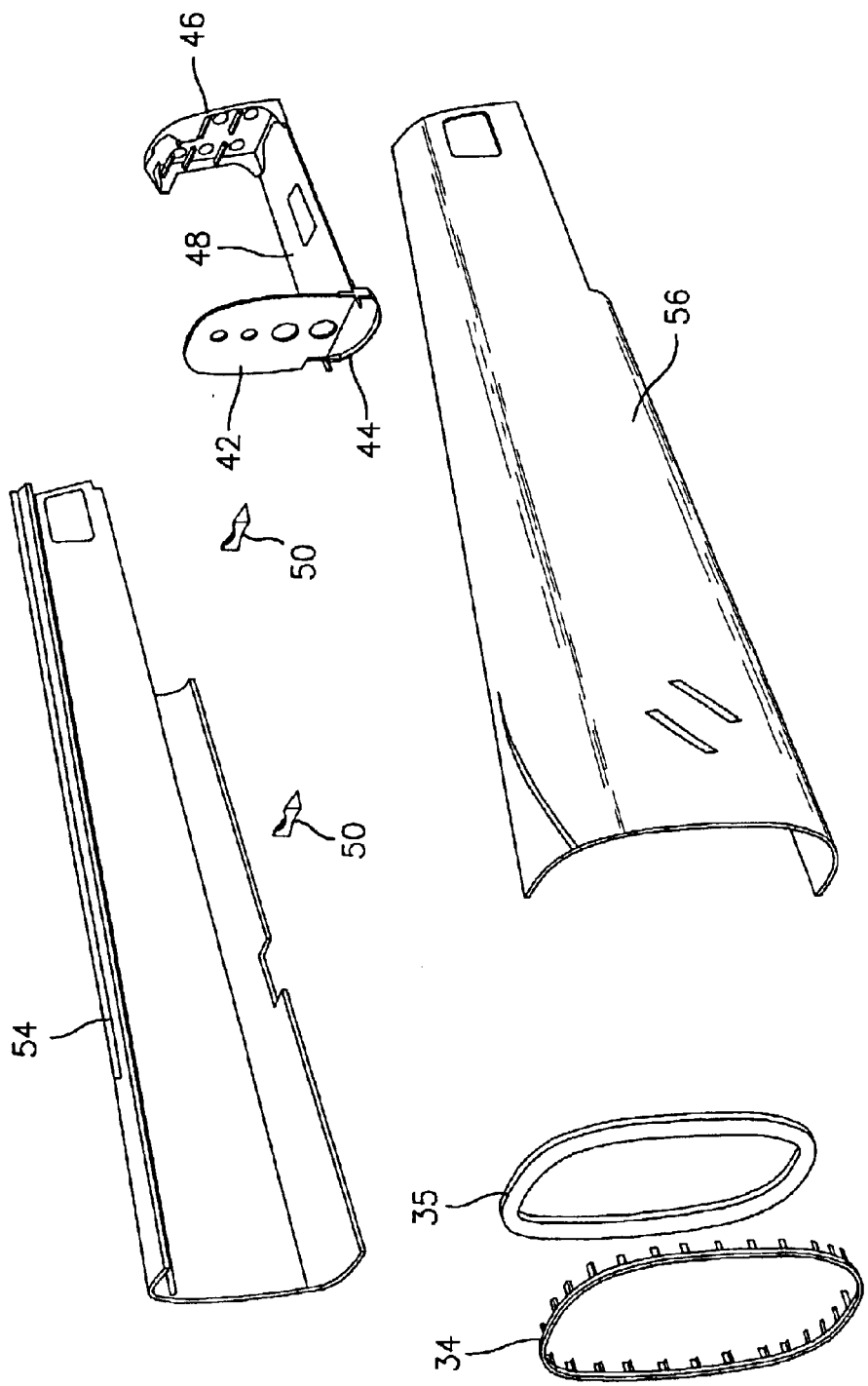
FIG. 5 is an exploded view of a second embodiment of a tail cone in accordance with the present invention.
Figure 7:
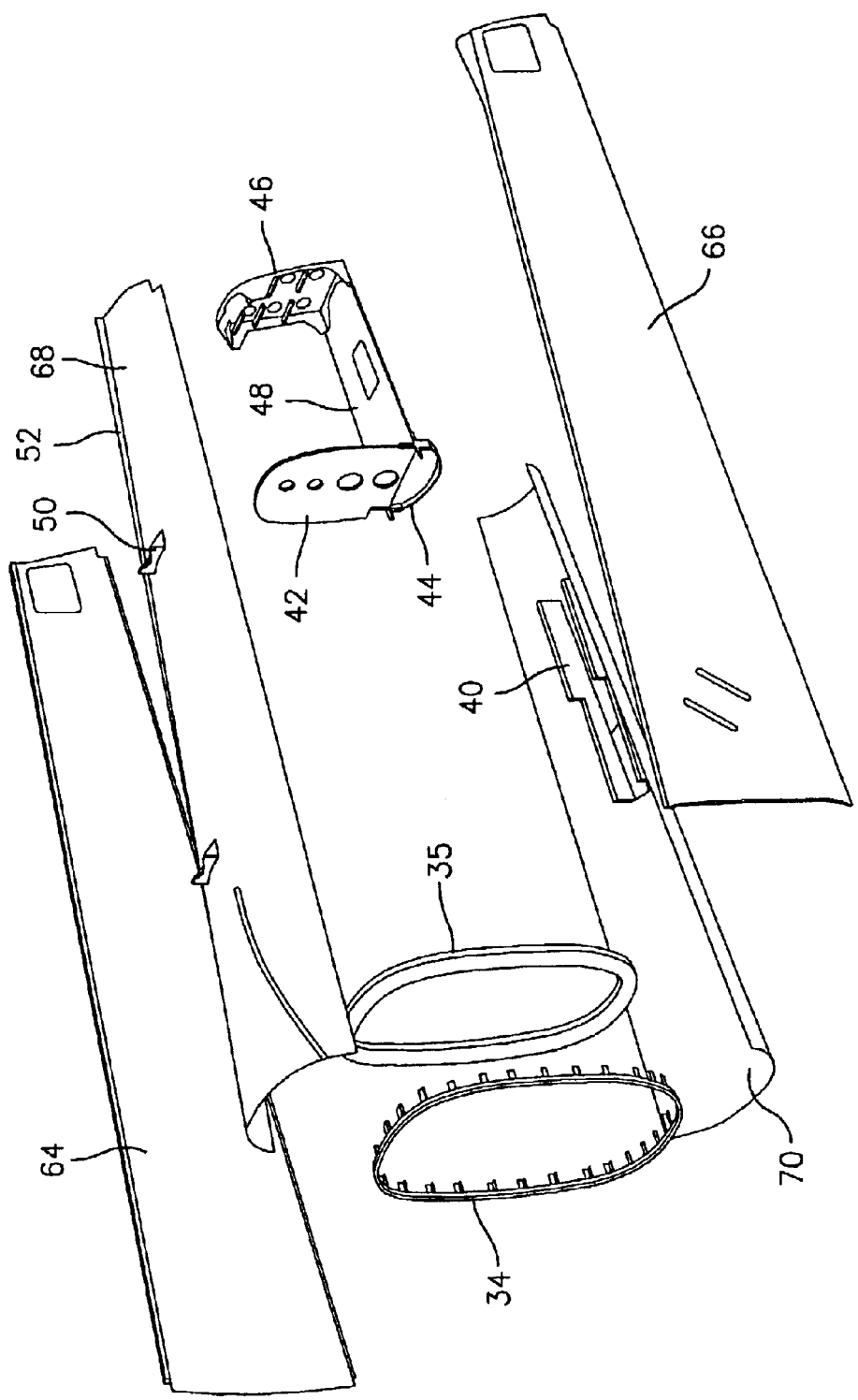
FIG. 7 is an exploded view of a fourth embodiment of a tail cone in accordance with the present invention.

As shown in FIG. 4, the shell 12 may be formed from a single piece of composite material. Alternatively, the shell 12 may be formed from two mirror image, joined together pieces 54 and 56 of composite material as shown in FIG. 5, from three joined together pieces 58, 60, and 62 as shown in FIG. 6, or from four joined together pieces 64, 66, 68, and 70 as shown in FIG. 7.

Figure 2:
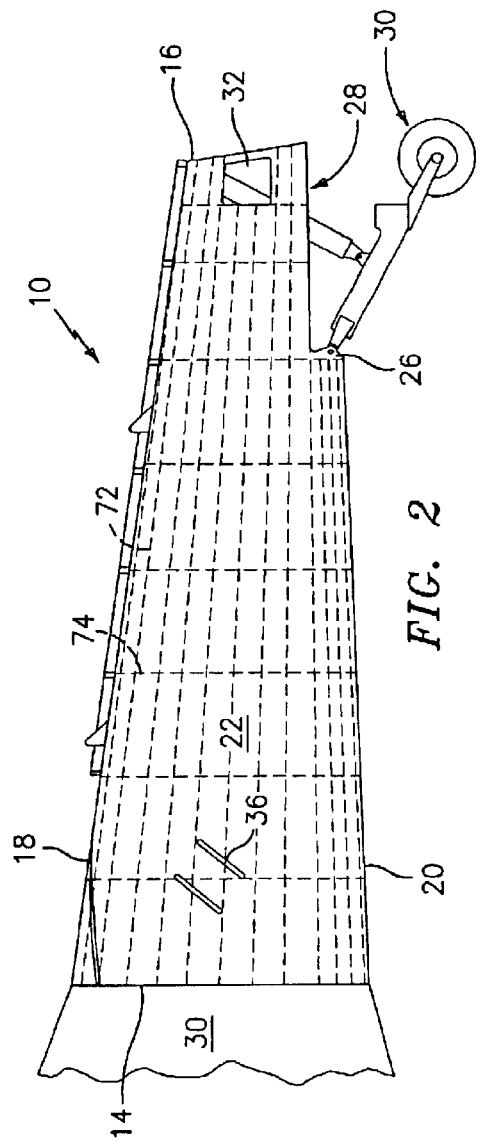
FIG. 2 is a perspective view of a tail cone having a skin-stringer-frame construction.

If desired, the shell 12 may be provided with a stringer-frame arrangement as shown in FIG. 2. The stringer-frame arrangement includes a plurality of stringers 72 extending from the leading edge 14 to the trailing edge 16 and a plurality of stiffeners 74 joined to and extending perpendicular to the stringers 72. Each of the stringers 72 and the stiffeners 74 may be formed from a composite material having a non-metallic matrix. The composite material may be the same as, or different from, the composite material forming the shell 12. For example, the composite material may comprise an epoxy resin matrix having graphite fibers embedded therein. The stringers 72 and/or the stiffeners 74 may be fabricated to have either a channel or a Z shape in cross section.

Alternatively, the shell 12 could be formed using a sandwich construction such as that shown in FIG. 3. In a sandwich construction, the shell 12 could have an outer non-metallic skin layer 76, an inner non-metallic layer 78 spaced from the outer layer 76, and a non-metallic core layer 80 intermediate the layers 76 and 78. The core layer 80 could have a honeycomb construction if desired. When a honeycomb construction is used, the various honeycombs could be filled with a non-metallic material. Each of the layers 76, 78, and 80 may be formed from a composite material having a non-metallic matrix. The composite material forming the layers 76, 78, and 80 may be the same as, or different from, the composite material forming the shell 12. For example, each of the layers could be formed from an epoxy resin material having graphite fibers embedded therein.

The tail cone assembly of the present invention provides numerous advantages. First, it is lighter in weight than conventional tail cone assemblies. Second, it is less expensive to produce. Third, the tail cone assembly can have integral stiffening/joining members which provide stiffening while simultaneously providing an attachment zone. This minimizes external fasteners and allows the use of protruding head fasteners, thus reducing laminate thickness and further reducing weight. Fourth, the manufacture of the tail cone assembly is simpler. For example, the composite material may be applied either via automated means or by conventional means over the tooling and internal structure and co-cured simultaneously.

If desired, features such as the tail cone attachment fitting 34, the frame 35, the chaff dispenser supports 36, the antenna support 40, the landing support bulkhead 42, the drive shaft supports 50, and/or the drive shaft cover supports 52 may be formed with the portions of the shell 12 to which they are attached. Such a construction reduces the need for fasteners and reduces the weight of the tail cone assembly 10.

It is apparent that there has been provided in accordance with the present invention a composite tail cone assembly which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A tail cone for a helicopter comprising a monocoque shell, said shell being formed from a composite sandwich construction having a non-metallic inner layer, a non-metallic outer layer, and a non-metallic core layer intermediate said inner and outer layers, and said inner layer, said outer layer and said core layer each being formed by an epoxy resin material having fibers embedded therein, said shell being hollow and having a leading edge, a trailing edge, an upper surface extending between said leading edge and said trailing edge, and a lower surface having an opening therein adjacent said trailing edge, a rear landing gear, a pair of side surfaces extending from said leading edge to said trailing edge and each of said side surfaces having an opening in a region in the vicinity of said trailing edge for gaining access to equipment relating to said rear landing gear.

2. A tail cone according to claim 1, wherein said core layer comprises a honeycomb structure.

3. A tail cone according to claim 1, wherein said shell tapers from said leading edge to said trailing edge.

4. A tail cone assembly for a helicopter comprising:

a monocoque shell formed from a composite material;

said shell having a leading edge, a trailing edge, a bottom surface extending from said leading edge and terminating at a point remote from said trailing edge, an upper surface extending from said leading edge to said trailing edge, and a pair of side surface extending from said leading edge to said trailing edge; and a tail cone attachment fitting positioned within said shell at a location adjacent a leading edge of said shell, said tail cone attachment fitting being formed from a composite material having a non-metallic matrix.

5. A tail cone assembly according to claim 4, further comprising said shell being formed in a single piece.

6. A tail cone assembly according to claim 4, further comprising said shell being formed by two mirror-image pieces joined together.

7. A tail cone assembly according to claim 4, further comprising said shell being formed by three pieces joined together.

8. A tail cone assembly according to claim 4, further comprising said shell being formed by four pieces joined together.

9. A tail cone assembly according to claim 4, further comprising said shell having a sandwich construction.

10. A tail cone assembly according to claim 4, further comprising a plurality of stringers within said shell extending from said leading edge to said trailing edge and each of said stringers being formed from a composite material.

11. A tail cone assembly according to claim 4, further comprising a plurality of stiffeners within said shell and each of said stiffeners being formed from a composite material.

12. A tail cone assembly according to claim 4, wherein said composite material comprises a non-metallic matrix having fibers embedded therein.

13. A tail cone assembly according to claim 4, wherein said composite material comprises an epoxy resin matrix having graphite fibers embedded therein.

14. A tail cone assembly according to claim 13, wherein said embedded graphite fibers extend in more than one direction.

15. A tail cone assembly according to claim 4, further comprising a tail rotor pylon support located adjacent a trailing edge of said shell.

16. A tail cone assembly according to claim 15, further comprising said tail rotor pylon support being formed from a composite material having a non-metallic matrix.

17. A tail cone assembly according to claim 4, further comprising a landing support bulkhead positioned intermediate a leading edge and a trailing edge of said shell.

18. A tail cone assembly according to claim 17, further comprising said landing support bulkhead being formed from a composite material having a non-metallic matrix.

19. A tail cone assembly according to claim 17, further comprising a tie down support attached to said landing support bulkhead.

20. A tail cone assembly according to claim 19, further comprising said tie down support being formed from a composite material having a non-metallic matrix.

21. A tail cone assembly according to claim 4, further comprising said shell having side walls and a plurality of chaff dispenser supports attached to said side walls.

22. A tail cone assembly according to claim 21, further comprising each of said chaff dispenser supports being formed from a composite material having a non-metallic matrix.

23. A tail cone assembly according to claim 4, further comprising said shell having a lower surface and an antenna support attached to said lower surface.

24. A tail cone assembly according to claim 23, further comprising said antenna support being formed from a composite material having a non-metallic matrix.

25. A tail cone assembly according to claim 4, further comprising said shell having an upper surface and a plurality of drive shaft supports mounted to said upper surface.

26. A tail cone assembly according to claim 25, further comprising said drive shaft supports each being formed from a composite material having a non-metallic matrix.

27. A tail cone assembly according to claim 25, further comprising a plurality of drive shaft cover supports mounted to said upper surface.

28. A tail cone assembly according to claim 27, further comprising each of said drive shaft cover supports being formed from a composite material having a non-metallic matrix.

29. A tail cone assembly according to claim 4, further comprising an opening in a lower surface of said shell and a landing gear plate positioned within said opening.

30. A tail cone assembly according to claim 29, further comprising said landing gear plate being formed from a composite material having a non-metallic matrix.

31. A helicopter comprising:

a tail cone;

said tail cone having a hollow, tapered monocoque shell formed from a first composite material having a non-metallic matrix and fibers embedded within the matrix;

said shell having a leading edge, a trailing edge, an upper surface, a lower surface, and a pair of side walls;

a tail cone attachment fitting located adjacent said leading edge of said shell;

a landing support bulkhead located intermediate said leading edge and said trailing edge, and adjacent an opening in said lower surface;

a tail rotor pylon support located adjacent said trailing edge of said shell;

a landing gear support plate joined to said tail rotor pylon support and said landing support bulkhead;

a tie down support attached to said landing support bulkhead;

a plurality of drive shaft supports attached to said upper surface;

a plurality of drive shaft cover supports attached to said upper surface; and a plurality of chaff dispenser supports attached to said side walls.

32. A helicopter according to claim 31, wherein each of said tail cone attachment fitting, said chaff dispenser supports, said landing support bulkhead, said tie down support, said tail rotor pylon support, said landing gear support plate, said drive shaft cover supports, and said drive shaft supports are formed from a second composite material.

33. A helicopter according to claim 32, wherein said second composite material is the same as said first composite material.

34. A helicopter according to claim 32, wherein said second composite material is different from said first composite material.

35. A helicopter according to claim 31, wherein at least one of said tail cone attachment fitting, said chaff dispenser supports, said landing support bulkhead, said tie down support, said tail rotor pylon support, said landing gear support plate, said drive shaft cover supports, and said drive shaft supports is formed from a second composite material.

36. A helicopter according to claim 35, wherein said second composite material is the same as said first material.

37. A helicopter according to claim 35, wherein said second composite material is different from said first composite material.

* * * * *